United States Patent
Tsybulevski et al.

(10) Patent No.: US 11,376,572 B2
(45) Date of Patent: Jul. 5, 2022

(54) CATALYST FOR REMOVAL OF SULPHUR OXIDES FROM FLUE GASES OF POWER PLANTS

(71) Applicants: M Chemical Company, Inc., Los Angeles, CA (US); N.D. Zelinsky Institute of Organic Chemistry RAS (IOKh), Moscow (RU)

(72) Inventors: Albert Tsybulevski, Louisville, KY (US); Eduardo Bolivar, The Woodlands, TX (US); Alexander Avraamovich Greish, Moscow (RU); Leonid Modestovich Kustov, Moscow (RU)

(73) Assignees: M Chemical Company, Inc., Los Angeles, CA (US); N.D. Zelinsky Institute of Organic Chemistry RAS (IOKh), Moscow (RU)

( * ) Notice: Subject to any disclaimer, the term of this patent is extended or adjusted under 35 U.S.C. 154(b) by 0 days.

(21) Appl. No.: 17/078,318

(22) Filed: Oct. 23, 2020

(65) Prior Publication Data
US 2021/0121858 A1    Apr. 29, 2021

(30) Foreign Application Priority Data
Oct. 24, 2019   (RU) .............. RU2019133972

(51) Int. Cl.
| | | |
|---|---|---|
| *B01D 53/86* | (2006.01) | |
| *B01J 29/08* | (2006.01) | |
| *B01J 29/14* | (2006.01) | |
| *B01J 29/16* | (2006.01) | |
| *B01J 35/02* | (2006.01) | |
| *B01J 35/04* | (2006.01) | |

(52) U.S. Cl.
CPC ........ *B01J 29/143* (2013.01); *B01D 53/8609* (2013.01); *B01J 29/087* (2013.01); *B01J 29/163* (2013.01); *B01J 35/023* (2013.01); *B01J 35/04* (2013.01); *B01D 2255/50* (2013.01); *B01D 2257/302* (2013.01); *B01D 2258/0283* (2013.01)

(58) Field of Classification Search
CPC . B01J 29/08; B01J 29/081; B01J 29/10; B01J 29/14; B01J 29/16; B01J 2229/16; B01D 53/1481; B01D 53/508; B01D 53/8609; B01D 2253/1085; B01D 2255/207; B01D 2255/50; B01D 2257/302; B01D 2258/0283

See application file for complete search history.

(56) References Cited

U.S. PATENT DOCUMENTS

| | | |
|---|---|---|
| 4,963,520 A | 10/1990 | Yoo et al. |
| 5,213,779 A | 5/1993 | Kay et al. |
| 5,853,684 A | 12/1998 | Fang et al. |
| 6,974,787 B2 | 12/2005 | Chester et al. |
| 7,572,414 B2 | 8/2009 | Karrs et al. |
| 7,960,307 B2 | 6/2011 | Gao et al. |
| 2002/0009404 A1* | 1/2002 | Tsybulevskiy ......... B01J 20/186 423/244.04 |

OTHER PUBLICATIONS

Haldor Topsoe: "SNOX™ Efficient and cost effective removal of Sox, NOx, HG and particulates from flue gas when burning sulfur-containing fuels", [retrieved Oct. 1, 2020]. 18 pages. Retrieved from the Internet: <URL: https://cdn2.hubspot.net/hubfs/2115834/SNOX-en/SNOX%20report_brochure_lay3.pdf?utm_campaign=SNOX_en&utm_medium=email&_hsmi=61980400&_hsenc=p2ANqtz-9yjJxOtAfU02O55sH1LijhObZWY7q1IG2Oa0VAfJKoBi7yktpDvgLthW9i7BHIXLhljz9vy1XMX28OgoMLpWWkjs6Uqg&utm_content=61980400&utm_so.
Moody, D.C. et al., "Catalytic Reduction of Sulfur Dioxide", Journal of Catalysis, v. 70 (1), 1981. 4 pages.
Kül, G.H., "Crystallization of Low-Silica Faujasite (SiO2:Al2O3~2.0")", Zeolites, 1987, 7, 451. 7 pages.
Tkachenko, O.P. et al., "Low-temperature CO oxidation by transition metal polycation exchanged low-silica faujasites", Applied Catalysis B: Environmental, 2015, 179, 521. 38 pages.
Tsybulevski, A.M. et al., "Reactive adsorption of sulfur compounds on transition metal polycation-exchanged zeolites for desulfurization of hydrocarbon streams", Energy Technology, 2017, 5, 1627. 12 pages.

* cited by examiner

*Primary Examiner* — Timothy C Vanoy
(74) *Attorney, Agent, or Firm* — Woodard, Emhardt, Henry, Reeves & Wagner, LLP

(57) ABSTRACT

The present invention relates to the catalytic processes for rendering harmless the flue gases of the power stations or more precisely to the catalysts for sulfur oxides reduction to elemental sulfur. The novel catalyst presents the binary polycations of copper and zinc or copper and manganese incorporated into the low silica faujasite X (LSX) having transition metals ratio Cu:Zn or Cu:Mn in the range of 2:1 to 4:1.

3 Claims, No Drawings

CATALYST FOR REMOVAL OF SULPHUR OXIDES FROM FLUE GASES OF POWER PLANTS

CROSS REFERENCE TO RELATED APPLICATIONS

This application claims the benefit of Russia Application No. 2019133972A filed Oct. 24, 2019, now Russia Patent No. 2729422, the entire disclosure of which is hereby incorporated by reference.

FIELD OF INVENTION

The present invention relates to the catalytic processes for rendering harmless the flue gases of the power stations or more precisely to the catalysts for sulfur oxides reduction to elemental sulfur. The novel catalyst presents the binary polycations of copper and zinc or copper and manganese incorporated into the low silica faujasite X (LSX) having transition metals ratio Cu:Zn or Cu:Mn in the range of 2:1 to 4:1. The distinctive feature of the catalyst preparation procedure consists of the cation exchange operation carrying out by partially hydrolyzed salts of transition metals at the pH range of 5.2-5.8.

BACKGROUND ART

The present invention suggests the highly efficient catalyst for sulfur compounds removal from the power station flue gases by means of their reduction by carbon monoxide into elemental sulfur.

Coal firing power stations are responsible for 40% of the total nation electric power output. The total content of sulfur compounds in the domestic anthracite and bituminous coals makes up of 0.8-6.0% w. In the process of coal burning sulfur is converted into sulfur dioxide ($SO_2$) and sulfur trioxide ($SO_3$) which form sulfuric acid in the atmosphere. Finally, the latter falls on the ground in the shape of acid rains that in turn are hazardous for population health and environment. In such a manner, rendering harmless the flue gases of power stations is the nation actual, serious problem.

Various catalytic processes are well known for the removal of these sulfur compounds from the flue gases. For instance, U.S. Pat. No. 4,963,520 discloses the process for $SO_2$ removal by means sulfur dioxide oxidation into sulfur anhydrate and production of the sulfuric acid. The main features and merits of this process have been described in a greater detail in the Danish company Haldor Topsoe brochure: "SNOX™—Efficient and Economic removal of sulfur contaminated compounds from flue gases.", 1981. The main disadvantage of this process consists of necessity collecting, storing and realization of significant volume of low concentration sulfuric acid. Indeed, the power station having installed capacity of 2,200 Megawatts has to burn ~4 million Mt/year fuel that in turn, even in the case of 0.5% w. sulfur content would cause approximately 200,000 Mt output of sulfuric acid of 33% concentration.

The catalysts, which allow the reduction of sulfur oxides into elemental sulfur are also well known and are characterized by more advantages. The general overview of those catalysts has been given in the paper D. C. Moody et al, "Catalytic Reduction of Sulfur Dioxide", Journal of Catalysis, v. 70 (1), 1981. It is also known U.S. Pat. No. 5,213,779 that suggests to use metal lanthanides as the desulfurization catalyst while U.S. Pat. No. 5,853,684 uses for the same purpose lanthanum oxide in combination with cobalt and strontium sulfides. The common demerits of those catalysts include the high costs of the rare earth metals, their relatively low resistance to sulfation and high temperature (300-800° C.) requirement for their efficient application. The all these features lead to the significant rising the costs of the electric power production.

Several other types of catalysts for intensive recovery of sulfur oxides from flue gases have been formed which are based on the high silica zeolites USY, ZSM, SSZ-13 and so far. U.S. Pat. No. 6,974,787 employs as flue gas desulfurization catalyst vanadium-cerium exchanged forms of the ultra-stable faujasite USY, whereas U.S. Pat. No. 7,572,414 uses vanadium, titanium, wolfram and molybdenum oxides which are loaded over high silica zeolite as a carrier. The high content of metals IY-VI groups of the Periodic System in the catalysts composition and their extremely high cost essentially limit possibility of commercial application of such catalysts.

It is also known the catalyst which is disclosed in U.S. Pat. No. 7,960,307. According to the invention, the catalyst presents Zn-, Mn-, Cu- and Ni-exchanged forms of zeolites USY, BETA, ZSM, which are characterized by high ratio $SiO_2:Al_2O_3$ oxides, higher than 10.0, and include loaded over zeolite surface metal vanadate. The narrow commercial availability of the high silica zeolites in the catalyst's composition, complexity of the process for catalysts preparation as well as a low activity of the catalysts of the prior art in the reaction of sulfur oxides reduction at the temperatures below 300° C. are the main disadvantages of the known catalysts.

While these products have been useful for flue gases desulfurization, it is important to create the new catalysts which would overcome the disadvantages of the prior art.

It is therefore an aspect of the invention to produce a novel catalyst for sulfur oxides reduction with improved efficacy in protection of the environment.

It is further aspect of the invention to produce Cu—Zn, Cu—Mn polycation exchanged forms of low-silica faujasite.

It is a still further aspect of the invention to produce a catalyst for flue gases desulfurization providing an activity in the low temperature range, below 240° C.

It is a still further aspect of the invention to provide a low-cost catalyst for use for flue gases desulfurization which does not essentially increase the cost of electric power output by the power stations.

Still further objects and advantages will become apparent from consideration of the ensuing description of a preferred embodiment of the invention and the examples therewith.

SUMMARY OF INVENTION

In accordance with the present invention, there is provided a flue gases desulfurization catalyst, designed for the use at power stations, which catalyst comprises low-silica faujasite having silica to alumina oxides ratio on the level of 2.0-2.2 and contains the binary polycations of transition metals: copper and zinc or copper and manganese at their proportion Cu:Zn and Cu:Mn from 2:1 up to 4:1.

The invention is also a process for the production of this catalyst for sulfur oxides removal from flue gases.

The invention is also a process for flue gases desulfurization with use of the novel catalyst at the relatively low temperature range, below 240° C.

DETAILED DESCRIPTION OF THE INVENTION

The catalyst product of this invention is a low-silica faujasite having a molar ratio of silicon and aluminum oxides in the range of 2.0-2.2 whereas the said low-silica faujasite contains the binary polycations of transition metals copper and zinc or copper and manganese at their proportion Cu:Zn or Cu:Mn from about 2:1 to about 4:1.

The procedure for low-silica faujasite synthesis has been described by G. Kul, (G. H. Kül, "Crystallization of Low-Silica Faujasite ($SiO_2$:$Al_2O_3$~2.0"), Zeolites, 1987, 7, 451) and has been commercialized by several zeolite manufacturers. The simple process for zeolites polycation forms synthesis has been developed by the authors of the present invention, which alongside the activity of zeolites with the transition metals polycations in reactions of carbon monoxide and organic sulfur oxides oxidation has been published in the following papers: O. P. Tkachenko, A. A. Greish, A. V. Kucherov, K. C. Weston, A. M. Tsybulevski, L. M. Kustov "Low-temperature CO oxidation by transition metal polycation exchanged low-silica faujasites", Applied Catalysis B: Environmental, 2015, 179, 521 and A. M. Tsybulevski, O. P. Tkachenko, E. J. Rode, K. C. Weston, L. M. Kustov, E. M. Sulman, V. Y. Doluda, A. A. Greish "Reactive adsorption of sulfur compounds on transition metal polycation-exchanged zeolites for desulfurization of hydrocarbon streams", Energy Technology, 2017, 5, 1627.

An enhanced activity of the catalysts of the present invention in the oxidation reactions is caused by the transition metal polycations ability for transferring excessive oxygen atoms of polycations to the reactants. At the same time, the activity of the polycation catalysts in the reducing reactions, their capability to breaking away oxygen atoms from the reactants was unknown, was absolutely unexpected and surprisingly found by the authors of the present invention. The activity of the novel catalyst at the low temperatures range, its capability for complete elimination of sulfur dioxide even at 240° C. is also absolutely unexpected and amazing. The mentioned features of the novel catalyst open new ways for the desulfurization of flue gases of power stations.

In order to illustrate the present invention and the advantages thereof for sulfur oxides removal from flue gases, the following examples are provided. It is understood that these examples are illustrative and do not produce any limitation on the invention. In particular, it is important to understand that the present invention is generally applicable for power stations that are firing gas, liquid or solid fuels.

Examples 1-3

The Catalyst Samples Preparation

The preparation procedures, which are given below, are designated for obtaining ~140 g of the final product. The all catalyst samples were prepared on the basis of sodium-potassium form of zeolite LSX of the M Chemical Co manufacturing Example 1. Catalyst $(Cu)_p(Zn)_p$CaLSX-4

Although the cations of alkali and alkaline-earth metals play a balanced role in the low-silica zeolite X structure, the preliminary conversion sodium-potassium form into calcium form is useful for the following synthesis of copper and zinc polycations. Thus, the preparation procedure includes the following operations:

a) Exchange of the alkali cations for $Ca^{2+}$ cations.
  Prepare 1 L of the 1N solution of calcium chloride by dissolution of 73.5 g $CaCl_2$.2($H_2O$) in deionized water (DIW);
  Treat 100 g granule of the origin zeolite by 1 L of 1.0N solution of $CaCl_2$ at the ambient temperature and proper mixing. Maintain the pH of the exchanged solution in the range of 6.5-7.0 to obtain ~55-60%-exchanged CaLSX sample;
  Wash the granules in ~10 L of DIW.

b) $Cu^{2+}$-exchange.
  Prepare the buffer solution—0.05M basic sodium dihydro phosphate by dissolution of 6 g anhydrous $NaH2PO_4$ in 1 L DIW;
  Prepare 1 L of 1N $CuCl_2$ solution by dissolution of 85.6 g $CuCl_2$.$H_2O$ in 1 L DIW and lower pH of the exchange solution by addition of 35 ml of buffer to avoid a spontoon hydroxide precipitation;
  Treat the washed granules of CaLSX by 1 L of 1N solution of $CuCl_2$ at ambient temperature and instant agitation over 4 hours. Maintain pH of the exchange solution on the level of 5.0-5.4 with the use of sodium-dihydrophosphate buffer. The achieved ion exchange degree should be about ~50% Cu, 40% Ca;
  Wash the exchange product by 10 L DIW.

в) $Zn^{2+}$-exchange
  Prepare buffer solution—0.03M basic potassium hydro phosphate ($K_2HPO_4$). Dissolve 5.25 g $K_2HPO_4$ in 1 L DIW.
  Prepare 1 L of 1.5N zinc chloride solution. Dissolve 102 g anhydrous $ZnCl_2$ in 1 L DIW and to avoid the intense precipitation of zinc hydroxide, lower the solution pH by addition of 60 mL buffer.
  Treat CuCaLSF, as it was obtained in the operation b) of the catalyst sample $(Cu)_p(Zn)_p$CaLSX-4 synthesis by 1 L of 1.5N $ZnCl_2$ solution for 4 hours maintaining pH of the exchange solution on the level of 5.6-6.0 by buffer—0.03M $K_2HPO_4$.solution. The final cation ion exchange degrees in the catalyst sample are: Ca—15%, Cu—50%, Zn—12.5% equivalent.
  Wash the product by DIW up to the negative reaction for chloride ion by 0.028N $AgNO_3$ solution.

Example 2. Catalyst $(Cu)_p(Zn)_p$CaLSX-2

Replicate operations a) and b) of the above described procedure for $(Cu)_p(Zn)_p$LSX-4 the catalyst synthesis.
c) $Zn^{2+}$-exchange
Prepare 1 L of 2.5N zinc chloride solution. Dissolve 170 g anhydrous $ZnCl_2$ in 1 L DIW and lower pH solution by 75 mL buffer addition to avoid zinc hydroxide precipitation applying for the purpose 0.03M $K_2HPO_4$ solution;
Treat the product of stage b) of the previous sample preparation procedure, CuCaLSF sample by 1 L of 2.5N zinc chloride solution over 4 hours maintaining pH of the exchange solution on the level of 5.2-5.6 applying the $K_2HPO_4$ buffer solution. The achieved ion exchange degrees in the final product are: Ca—12%, Cu—45%, Zn—22% 3 KB.

Example 3. Catalyst $(Cu)_p(Mn)_p$LSX-2

Replicate a) and b) steps of the above described procedure for the catalyst $(Cu)_p(Zn)_p$LSX-4 synthesis.
в) $Mn^{2+}$-exchange
Prepare 1 L of 2N manganese chloride solution. Use 198 g $MnCl_2$.$4H_2O$ and dissolve it in 1 L DIW with the addition of 100 mL of buffer-potassium hydro phosphate to avoid manganese hydroxide precipitation.

Treat the $(Cu)_p$CaLSF sample, which was obtained on the step b) of the catalyst preparation over 4 hours by 1 L of 2N manganese chloride solution maintaining pH of the exchange solution on the level of 5.1-5.4 by means of $K_2HPO_4$ buffer. The cation composition in the obtained product is: Ca—15%, Cu—50%, Mn—25% equiv.

Example 4

Catalyst $(Cu)_p(Zn)_p$CaLSX-2 EXAFS Specters—Confirmation of the Catalyst Polycation Structure EXAFS-specters of the catalyst $(Cu)_p(Zn)_p$CaLSX-2 sample were recorded at the BM23 European Synchrotron Radiation Station (ESRF, Grenoble, France). The specters of metal foil were recorded simultaneously for comparison. The measured parameters of copper and zinc cations are presented in Table 1.

TABLE 1

Polycations Cu and Zn Structure Parameters in the Catalyst $(Cu)_p(Zn)_p$CaLSX-2

| Cation | Me—O bond length, Å | Oxygen Content, N | Cation Surface Area $\sigma \times 10^{-3}$, Å$^{-2}$ |
|---|---|---|---|
| Cu—O | 1.97 ± 0.01 | 3.08 ± 0.19 | 4.7 ± 0.1 |
| Zn—O | 2.05 ± 0.01 | 3.75 ± 0.16 | 9.4 ± 1 |

The results of spectral measurements unambiguously confirm copper and zinc polycations presence in the $(Cu)_p(Zn)_p$CaLSX-2 catalyst. The length of cation measured radii significantly exceeds the standard bond length in monocations (1.97; 2.05 versus 1.95), while an average oxygen content is essentially higher than stoichiometric one and the surface that is occupied by Cu and Zn polycations is 2-3 pe3a larger than monocation size.

Example 5

The Catalyst Activity Test

The catalyst samples of Examples 1-3 were tested for activity in the reaction of sulfur dioxide reduction by carbon monoxide alongside the $La_2O_3.TiO_2$ (anatase) catalyst sample, which is known from U.S. Pat. No. 5,213,779. The activity measurements were conducted with use of metal reactor of 9 mm diameter and 40 cm length. The sample granulation size was 1.6-2.0 mm. Preliminary samples training was carried out at 250° C. over 2 hours in nitrogen flow. The composition of initial gas mixture was: $SO_2$—0.5%, CO—1.5%, He—98%. The gas volume rate—120-160 cm³/min. The reaction temperature was varied in the 220-380° C. range.

The reaction products analysis was conducted by GC with the katharometer detector with the use of three packed columns: Column 1—length 1.5M, stationary phase—molecular sieve 5 A; Column 2—length 1.5M, stationary phase—Parapack Q; Column 3—length 2M, stationary phase—Chromosorb SE-54.

The test results are disclosed in Table 2.

TABLE 2

$SO_2$ Conversion Degree over Various Catalysts Depending on the Reaction Temperature

| | Conversion Degree, % mole Temperature, ° C. | | | | |
|---|---|---|---|---|---|
| Catalyst | 220 | 240 | 280 | 300 | 380 |
| $(Cu)_p(Zn)_p$CaLSX-2. | 92 | 100 | 100 | n/d | n/d |
| $(Cu)_p(Zn)_p$CaLSX-4. | 90 | 95 | 100 | n/d | n/d |
| $(Cu)_p(Mn)_p$LSX-2 | 95 | 100 | 100 | н/д | н/д |
| $La_2O_3 \cdot TiO_2$ | 0 | 0 | 15 | 42 | 98 |

The catalysts, according to the present invention demonstrated outstanding efficiency in sulfur dioxide elimination and therefore in the environment protection performance. As it can be seen from Table 2, the catalysts of the present invention are able to provide a practically complete sulfur dioxide removal at the temperature that is 150° C. lower than the highest ability of the catalysts of prior art. Thus, it is apparent that the catalysts of the present invention can provide substantial technical and economic achievements at their implementation at the power stations.

While the above description contains many specifics, these should not be considered as limitations on the scope of the invention, but rather an exemplification of one preferred embodiment thereof. Many other variations of the catalyst composition are possible.

We claim:

1. A catalyst for sulfur oxides removal from flue gases of power stations, comprising a low-silica faujasite LSX with the binary polycations of transition metals of IB, IIB, VIIB and VIIIB groups of the Periodic System, wherein the low-silica faujasite is characterized the ratio of $SiO_2:Al_2O_3$ oxides from about 1.8 to about 2.2 and includes binary polycations of copper and zinc at their correlation from about 2:1 to about 4:1.

2. The catalyst of claim 1, wherein the said low-silica faujasite includes the binary polycations of copper and manganese at their correlation from about 2:1 to about 4:1.

3. The catalyst of claim 1, wherein the said low-silica faujasite includes the binary polycations of copper and manganese at their correlation from about 2:1 to about 4:1.

* * * * *